3,232,435
FILTER
William L. Fismer, Verona, N.J., assignor to T. Shriver & Company, Incorporated, Harrison, N.J., a corporation of New Jersey
Filed May 18, 1962, Ser. No. 195,804
3 Claims. (Cl. 210—230)

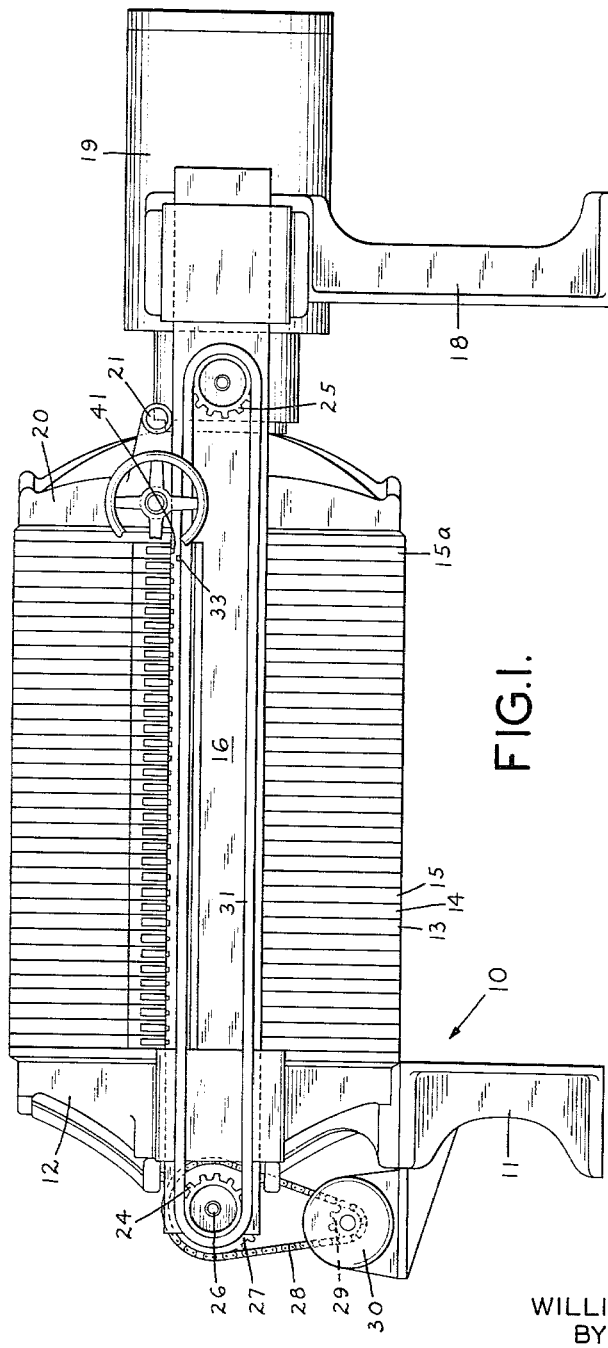

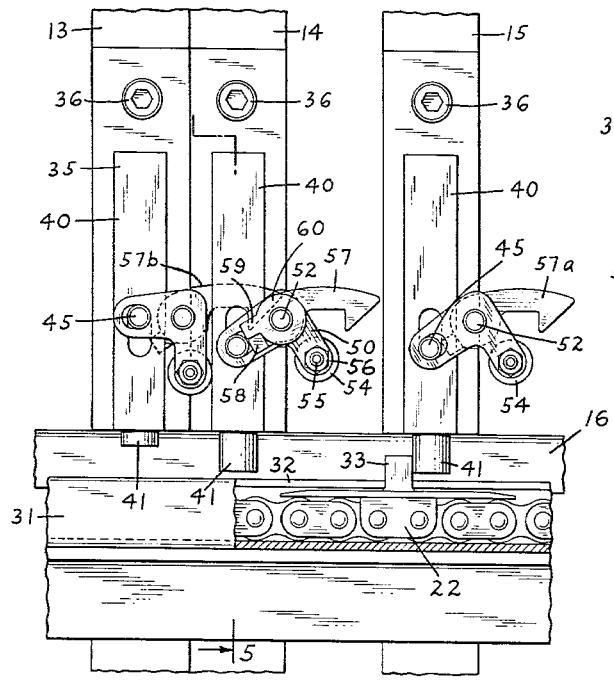
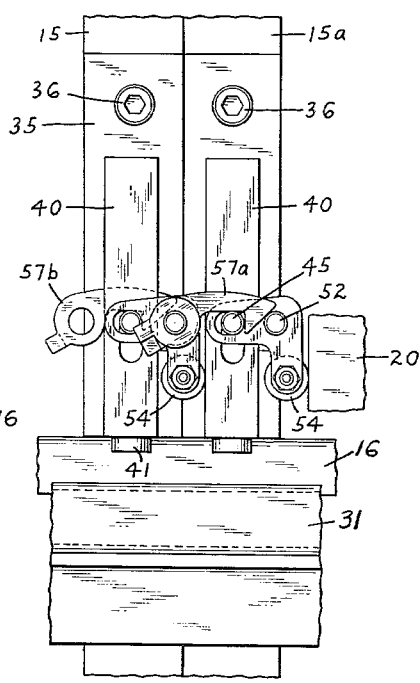
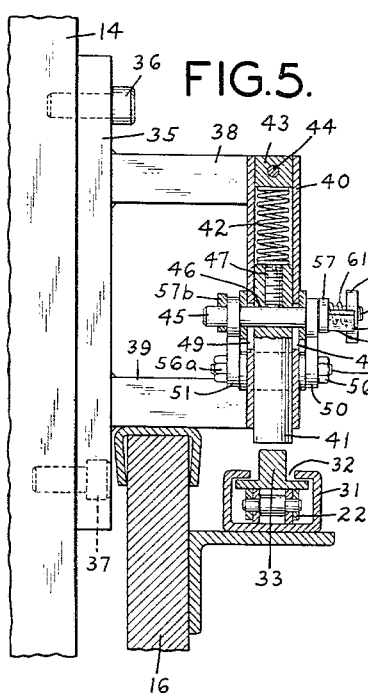
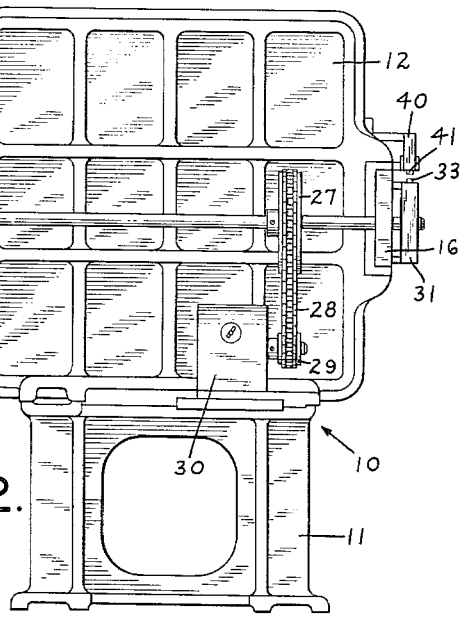

This invention relates to improvements in filter presses and particularly to filter presses having automatic means for shifting the plates and/or frames thereof to facilitate the removal of the cake and cleaning of the filter press plates.

Many different types of automatic plate shifters for filter presses have been proposed heretofore but because of the difficulty encountered in the problem of separating the plates and moving them individually, such prior plate shifters have not been altogether satisfactory. Usually a filter press requiring a plate shifting mechanism has large and heavy filter plates. Such plates individually are difficult to move and even more difficult to separate because of the adhesion of the cake to the plates or the filter cloths interposed between them. As a result, the plates tend to bind together and when one plate is shifted, it tends to shift the next adjacent plate or several of the plates thereby causing canting of the plates and sometimes causing them to be dislodged from the filter press frame. The canting action can either take place transversely over the frame or around the top or bottom edge of the plate and for that reason and in order to avoid difficulty and possible danger, many of the prior plate shifting mechanisms are disposed above the plates and suspend them from above or are centrally disposed thereby reducing the filtering capacity of the press. Moreover, the mechanisms which have been provided in order to assure the movement or shifting of individual plates have been unnecessarily complex and have been difficult and costly to manufacture.

In accordance with the present invention, an automatic plate shifter is provided which overcomes the aforementioned difficulties and with a relatively simple and sturdy type of mechanism separates and shifts the plates automatically one by one to expose both sides of each plate for discharge or removal of the filter cake therefrom.

More particularly, in accordance with the present invention, the filter press plates are mounted in a substantially conventional filter press frame provided with a plate shifting mechanism which typically may include endless chains disposed on opposite sides of the frame or of the guides which support the filter plates and carry projections which are engageable with latches or latch bolts carried on opposite sides of the filter plates in response to shifting of a leading or next adjacent plate. Moreover, the plates are provided with latching means which are releasable one by one so that only the leading plate can be released and shifted while all of the other plates remain locked together and thus assure separation of the leading plate from the remaining plate or plates and prevent canting or turning of the plates as they are shifted.

Also, in accordance with the present invention, the plate shifting mechanism can be readily applied to many conventional filter presses to convert a manually operated filter press into an automatic filter press.

For a better understanding of the present invention reference may be had to the accompanying drawings in which:

FIG. 1 is a side elevational view of a typical filter press embodying the present invention;

FIG. 2 is an end elevational view of the filter press;

FIG. 3 is an enlarged detail of the plate shifting mechanism of the filter press shown in side elevation with one of the filter press plates in the process of being shifted;

FIG. 4 is a side elevational view of a portion of the filter press showing two of the filter press plates in the fully shifted position; and FIG. 5 is a view in section taken on line 5—5 of FIG. 3.

The filter press chosen for purposes of illustration as shown in FIG. 1 may be of substantially conventional structure including a frame 10 having legs 11 at one end and a fixed end plate 12 against which the end most filter press plate 13 bears when the plates are in filtering relation. The filter press plates 13, 14, 15 etc., are generally similar and may be provided either with self-contained filter cloths of screens or may be of the type in which the filter cloth is lapped between the plates to form the filter medium thereof. However, in an automatic plate shifter type of filter press, the self-contained screens are preferred for the reason that it is easier to separate the filter cake from the press without interference from cloths draped over and looped between the plates. The plates are slidably supported on guide rails 16 and 17 (FIGS. 1 and 2) which are supported on the legs 11 and the legs 18 at the opposite end of the frame to form therewith a rigid supporting structure. A hydraulic jack 19 or its equivalent is mounted on the frame above the legs 18 and shifts the movable end plate 20 to press the plates together and against the end plate 12 to retain them in proper filtering relation. As illustrated in FIG. 1, the movable end plate 20 may be guided by means of suitable supporting rollers 21 which ride upon the upper edges of guide 16. It will be understood that any other type of jack, such as a screw-type jack, may be used for moving the movable end plate 20 toward and away from the stack of filter press plates 13, 14, 15 and so forth. The structure thus described does not form a part of the present invention, and, as indicated, may be of any conventional type.

In accordance with the present invention, the filter press described above is provided with a plate shifting mechanism which, as illustrated may include an endless chain 22 adjacent the outside of the guide rail 16 and a similar chain 23 (not shown) adjacent the guide rail 17. The chain 22 is supported on sprockets 24 and 25 on one side of the frame, and the chain 23 is supported on similar sprockets, on the opposite side of the frame. The sprocket 24 and the corresponding sprocket on the opposite side of the frame are connected by means of a cross shaft 26 which is driven by means of a sprocket 27 (FIG. 2) a chain 28, a sprocket 29 and a motor and reduction gear unit 30 at a selected and preferred speed. As shown in FIG. 1, the upper flight of the chains extends generally horizontally and parallel to the upper edge of the guide rail 16. Similarly, the upper flight of the chain 23 extends generally horizontally and parallel with the upper edge of the guide rail 17. Both the upper and the lower flights of the chain may be enclosed in protective casings or chain guards 31 each of which has a slot 32 around its outer periphery through which a lug or projection 33 on the chain extends. While only one projection or lug 33 is disclosed, it will be understood that two or more lugs may be provided, if desired.

Each of the filter plates is provided with elements of the plate shifting mechanism which are required for cooperation with the lugs 33 and the chains 22 and 23 on which they are mounted. It will be understood that the chains are properly related so that the lugs 33 thereon travel simultaneously in substantially parallel relation along opposite sides of the frame with their leading edges disposed at all times in a plane nearly perpendicular to the chains 22 and 23. The cooperation between the lugs 33 and the latching mechanisms on the filter plates is best shown in FIGS. 3, 4 and 5 of the drawings. FIG. 5 shows a typical latching mechanism on one vertical edge of a filter plate 14. Another latching mechanism of the same kind is mounted on the opposite vertical edge of the plate 14. All of the filter plates are similarly equipped. Each latching mechanism includes a base plate 35 which is secured to the filter plate 14 by means of screws 36 and 37. Extending outwardly from the plate 35 are a pair of arms 38 and 39 which carry at their outer end a vertical member 40 having a bore therein for receiving slidably a latch bolt or latch member 41 for selectively engaging the lug 33. The bolt 41 is normally biased downwardly by means of the spring 42 which has its upper end bearing against an insert plug 43 which is retained in position by means of a cross pin 44.

A transverse shaft 45 extends through a cross bore 46 in the bolt 41 and is secured therein against endwise movement and rotation by means of a screw 47 which is threaded into the upper end of the bolt 41. The cross shaft 45 is movable up and down in elongated slots 48 and 49 in opposite sides of the member 40 and receives pivotably and slidably the lefthand ends of bellcranks 50 and 51. The bellcranks 50 and 51 are pivotally mounted on a pivot pin 52 which is mounted on a boss extending outwardly from the tubular member 40. A roller 54 is mounted between the outer ends of the bellcranks 50 and 51 on a shaft 55 which has been secured to the bellcranks by means of nuts 56 and 56a on opposite ends of the shaft. The bellcranks and roller form a rocker member connected to each bolt.

With the arrangement described, and as shown, for example, in FIG. 3, when two of the plates, for example, plates 13 and 14 are in face to face engagement the roller 54 on the plate 13 will engage the side of the member 40 on the plate 14 and thereby will raise the bolt 41 to a retracted position above the level of the top of the projection 33 carried by the chains 22 or 23. On the other hand, when the plates 14 and 15 are separated as shown in FIG. 3, the rocker member on the plate 14 will be released from engagement with the member 40 on the plate 15 so that the spring 42 on plate 14 can push the plunger 41 downwardly into the path of the projection 33. The bolt 41 on plate 15 is shown as being in engagement with the projection 33 and as being moved to the right. Inasmuch as the bolts on both sides of the plate 15 engage the projections 33 on the chains 22 and 23 the plate 15 cannot twist, tilt, or cant as it slides along the guide rails 16 and 17.

Further in accordance with the present invention, means are provided for releasing the plates one by one for shifting movement. Thus, as shown in FIGS. 3 and 5, a hook member 57 is pivotally mounted on the shaft 52. The hook member 57 has a radially extending leg 58 at its inner end which cooperates with a stop or projection 59 on a disk-like member 60 which is secured non-rotatably to the end of the shaft 52. The hook member 57 is normally biased in a clockwise direction as viewed in FIG. 3 to a position in which the leg 58 engages the stop 59 by means of the spring 61 (FIG. 5) which has one end connected to the member 60 of the other end connected to the hook member 57. Counterclockwise movement of the hook member 57 is permitted by the spring 61. While the hook members 57 are mounted on both edges of the plates, space requirements frequently necessitate the hook members 57, stops 60 and springs 61 being mounted alternately on opposite ends of shafts 52 on successive plates as illustrated more particularly in FIGS. 3 and 4. For example, the hook member 57 and the disk-like member 60 are on the near side of the tubular members 40 on plate 14 while similar hook members 57a and 57b and stop disk members (not shown) corresponding to the member 60 are on shafts 52 on the back sides of the tubular members 40. Each hook member is constructed and arranged to engage the outwardly extending end portion of the cross pin 45 of the next adjacent plate to the right as viewed in FIGS. 3 and 4 when the plates are in face to face or adjacent relation. As illustrated in FIG. 3, when the plate 15, for example, is to be moved as by engagement of its bolts 41 with the lug 33, the cross pin 45 drops with the bolt 41 and thereby moves out from under the hook member 57 and releases the plate 15 from the plate 14. The plates 13 and 14 nevertheless will remain in latched engagement until the plate 15 has moved far enough to permit the bolts 41 on the plate 14 to move downwardly thereby disengaging the cross pin 45 on the latch of plate 14 from the hook 57b. For this reason, the group of filter plates which are hooked together will exert such a drag or resistance to movement that the plate 15 can readily be separated from the other plates and shifted to enable the cake to be removed or stripped therefrom. The endmost plate 15a (FIGS. 1 and 4) can be moved to the right hand end of the guide rails and will be released from the projections 33 by engagement of the roller 54 with the movable end plate 20 of the filter press. Movement of the plate 15a will be arrested for the reason that the rocker members are rocked clockwise and lift or retract the bolts 41 out of engagement with the projections 33.

As shown in FIG. 4, filter plate 15a does not have a hook member 57 thereon. On the other hand, the fixed end plate 12 may be provided with a hook member 57, but will not include latch bolts 41 and associated rocker members.

As the chains continue to move, the projections 33 engage successive filter plates and move them along the guide rails 16 and 17.

In a typical operation, with the filter press in operating condition as shown in FIG. 1, the hydraulic jack 19 is actuated to shift the movable end plate 20 to the right to its limit position. Upon movement of the end plate, the bellcranks on the right hand plate 15a will be released to enable bolts 41 to be moved by the springs 42 into the path of movement of the projections 33 on the chains 22 and 23. At the same time, the pin 45 disengages from the hook member 57a of the next adjacent plate 15, releasing the plate 15a for movement to the right. The chains 22 and 23 are then set in motion by means of the motor and reduction gear 30 and the projections 33 thereon will be moved from left to right, with the upper flights of the chains. When the projections 33 engage the bolts 41 on the plate 15a, it will be moved until the rollers 54 come into engagement with the movable end plate 20, at which time the bolts 41 are retracted and the plate 15a is released from the chains. As the plate 15a is moved away from the plate 15 the bolts 41 on the plate 15 are released for movement into the paths of the projections 33 and the cross pin 45 is released from the hook member 57 on the plate 14 so that the plate 15 is free to move. All of the remaining plates with the exception of the plate 15 are still locked together. When the projections 33 again pass around they will pick up the plate 15 and carry it over until it engages the plate 15a which causes the bolts 41 on the plate 15 to be retracted. This operation continues until all of the plates have been shifted into engagement.

As shown in FIG. 4 as each plate moves into engagement with a preceding plate the hook members 57 etc., reengage the pins 45 of the preceding plate. During movement of the plates, the filter cake can be scraped or otherwise removed from the faces of the plates since both faces are exposed during the shifting movement. After cleaning the filter plates, the jack 19 is actuated to shift the stack of filter plates to the left until they come into engagement with the end plate 12.

It will be understood from the foregoing description, that the latching mechanism and the shifting mechanism are foolproof in operation and are not rendered ineffective by the conditions which are present around filter presses. Tilting or canting the plates to the extent that they may drop from the frame of the filter press is prevented by the hook members. Even if one of the plates should be pulled slightly out of line due to adhesion to a plate being shifted, the two simultaneously moving lugs 33 will engage and straighten the misaligned plate as it is moved along the supporting rails 16 and 17.

It will be understood that the invention is susceptible to considerable modification for example in the type of mechanism for moving the projections 33 to shift the plates. Thus, if desired instead of a chain, a belt, a screw shaft with a quick return thread, a hydraulic mechanism using a piston and plunger or other equivalent mechanism may be used. Accordingly, the embodiment of the invention described herein should be considered as illustrative and the invention is not limited other than as defined in the following claims.

I claim:

1. A filter press comprising a pair of spaced, substantially horizontal guide members, a plurality of filter plates between said guide members, means on said filter plates slidably engaging said guide members and supporting said plates substantially perpendicular to said guide members, an endless flexible member adjacent to each guide member, and having a portion extending lengthwise of said guide member, means for driving said endless flexible members, lugs on said flexible members movable therewith lengthwise of said guide member in common planes parallel with said plates and in endless paths, latch elements on said filter plates adjacent to said guide members and movable toward and away from said flexible members, means continuously urging said latch elements toward said flexible members into said paths of said lugs for substantially simultaneous engagement therewith to move said plates lengthwise of said guide members, rocker members pivotally mounted on each side of each of said filter plates and each having an end connected with a latch element, and movable therewith and another free end, said free ends of said rocker members engaging a side of the next adjacent plate when said plates are in filtering relation to urge said latch elements out of said paths of said lugs.

2. The filter press set forth in claim 1 comprising a hook member on each of said filter plates, and means on each of said plates for latching engagement with said hook member on a next adjacent plate, and arranged to be moved out of latching engagement with said hook member upon movement of said latching elements into said paths of said lugs.

3. A filter press comprising a plurality of substantially parallel filter press plates, means supporting said plates for simultaneous and selective shifting movement along a substantially horizontal path, plate shifting members on opposite sides of said plates having substantially horizontal portions, at least one projection extending from each of said plate shifting members, means for driving said plate shifting members to move said projections simultaneously along said horizontal portions in substantially parallel paths and in common planes parallel with said plates, latch means on opposite sides of said plates movable toward and away from said plate shifting means into and out of said paths of said projections, respectively, means movably mounted on opposite sides of each plate and connected to the latch means thereon for moving said latch means, said movably mounted means having free ends extending toward an adjacent plate and engageable therewith to move said latch means out of said paths of said projections when said plates are substantially in engagement, and means for continuously urging said latch means into said paths of said projections when said free ends are out of engagement with the said adjacent plate for substantially simultaneous engagement of said latches on opposite sides of each plate with said projections.

References Cited by the Examiner

UNITED STATES PATENTS

| 1,020,746 | 3/1912 | Dehler | 198—20 |
| 1,390,531 | 9/1921 | Lockwood | 210—230 X |
| 2,714,849 | 8/1955 | Carver | 210—230 X |

FOREIGN PATENTS 526,983   7/1921   France.

REUBEN FRIEDMAN, *Primary Examiner.*
ROBERT F. BURNETT, *Examiner.*